May 11, 1943.    S. M. KASS    2,318,946
PIPE CLAMP
Filed Sept. 6, 1941
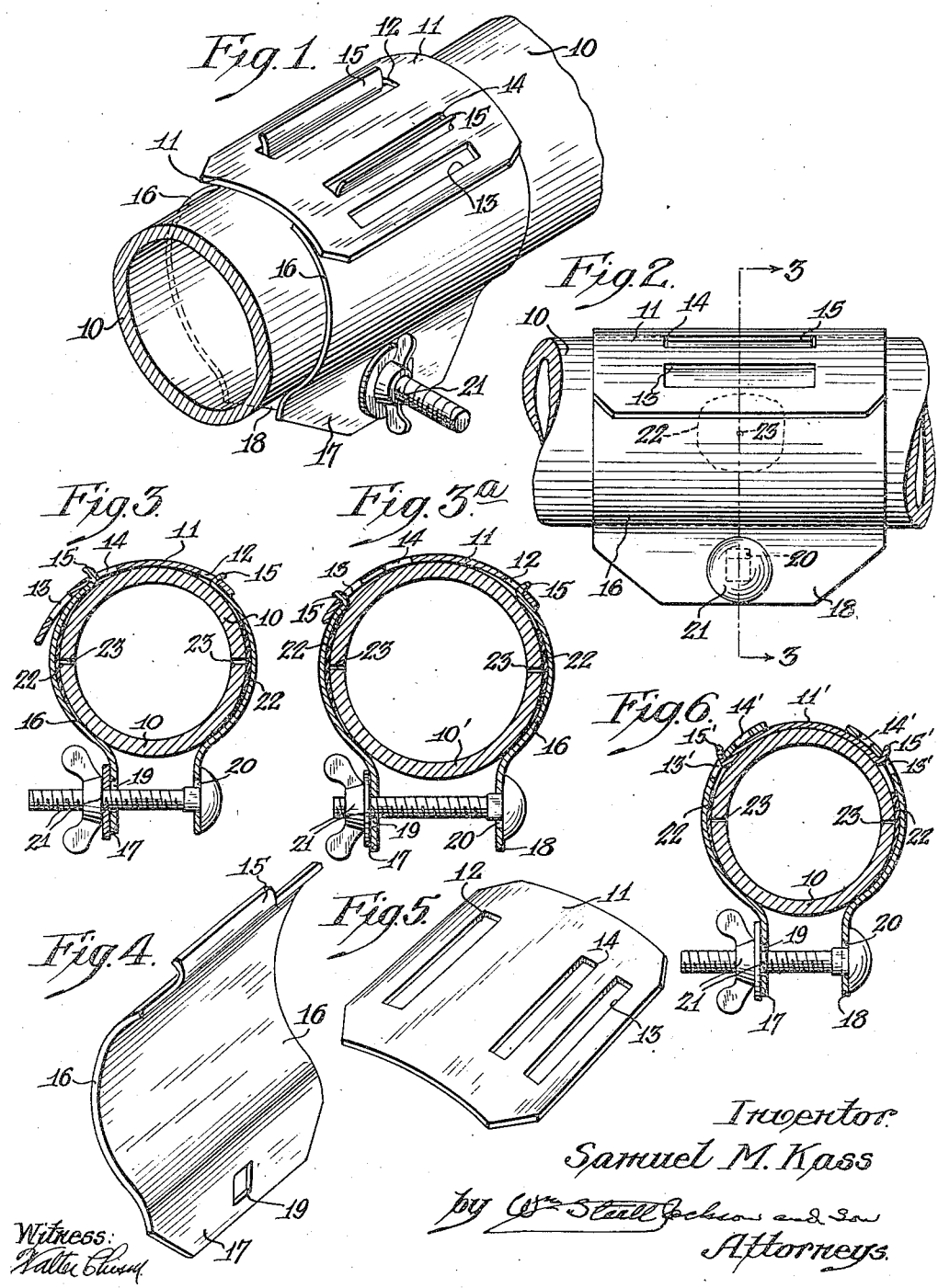
Inventor:
Samuel M. Kass Patented May 11, 1943

2,318,946

UNITED STATES PATENT OFFICE 2,318,946

PIPE CLAMP

Samuel M. Kass, Philadelphia, Pa.

Application September 6, 1941, Serial No. 409,791

5 Claims. (Cl. 24—19)

My invention relates to a repair pipe clamp which tightens a patch about a pipe which is leaking.

A purpose of the invention is to reduce as far as possible the slide movement of a pipe clamp while it is being set.

A further purpose is to provide lateral clamping members or side clamp members which may be duplicates, and a central or link member which is engaged by both side members and which supplies anchorages for hinge engagement by the side clamps.

A further purpose is to provide duplicate side patch pipe clamp members and a link pipe clamp member between their terminals and capable of engaging with the duplicate clamp members at different points so as to accommodate different sizes of pipe.

A further purpose is to provide duplicate lateral or side pipe clamp members of normal curvature corresponding to the largest size pipe to be repaired, along with a joining (central) link pipe clamp member having slots engaged by hooks or prongs upon the terminals of the lateral members, or vice versa, and adapted to engage the intermediate member through different slots or prongs to accommodate repair of different size pipes.

Further purposes will appear in the specification and in the claims.

Figure 1 is a perspective view of a clamp about a pipe.

Figure 2 is a side elevation of the structure seen in Figure 1.

Figure 3 is a section of the clamp taken upon line 3—3 of Figure 2.

Figure 3a is a section corresponding to Figure 3 but in which the clamp is applied to a larger pipe.

Figures 4 and 5 are perspectives of one of the duplicate side members and of the link respectively.

Figure 6 is a section showing a modification.

In the drawing similar numerals indicate like parts.

Clamp members for pipe repairs are well known. They appear chiefly in one piece encircling bands tightened by bolts engaging terminal band flanges and in two parts in which the parts tightened by the bolts through ears are effectively hinged together, either by actual hinges or by prongs of one part fitting into slots in the other. It is also old to have the prong of one part fit into alternative slots upon the other part.

The encircling band type of clamps are applied chiefly to holding rubber pipe against an interior fitting, to make pipe joints or to provide nozzles or water-supply connections. The two-part pipe-encircling clamp has been used largely in the tightening and retention of patches against leaky portions of pipe to be sealed.

My invention is directed to reduction in the sliding movement present during clamping, and to increasing sealing pressure, primarily by shifting the hinges of hinged pipe clamps to positions nearer to the patch.

In the drawing the pipe is shown at 10 in all the figures except in Figure 3a where it is shown at 10'.

The clamp comprises a preferably central link member 11 having slot 12 at one end of the link member and alternative slots 13 and 14 at the other end of the link member. The outer wall of one of slots 13 and 14 provides fulcrum and hinge connection for prong 15 of a side member 16, according to the size of pipe. The fulcrum and hinge connection with other side clamp is made through the wall of slot 12. Obviously the side members are substantially rigid to give effect to the leverage produced by the fulcruming upon the central link member.

In Figure 3a the clamp parts are the same but a larger pipe 10' is shown.

In Figure 6 slots 13', 14' appear in the side clamp members and prongs 15' upon the link member 11' cooperate with one or other of them.

Through whatever slots 13 or 14, 13', 14' the edge connection between the side members and the link is made, the link member is coupled to the side clamp members through slots and prongs upon these side members. The side members carry flanges or ears 17, 18 apertured at 19 and 20 for the insertion of a bolt and nut 21 by which the ears or flanges may be drawn toward each other.

In placing the clamp, the patch 22 is placed upon the section of the pipe to be repaired over a hole, for example, 23. The clamp parts are applied and the bolt is tightened against the flanges or ears to draw them toward each other and thereby to tighten the clamp against the outside of the patch and correspondingly tighten the patch against the section of the pipe which is to be sealed.

It will be noted that the effect of placing the intermediate link member between the side members is to bring the effective hinge anchorage of the side members much closer to the patch than is the case in the two-part construction where the hinge lies directly across the pipe from the flange and bolt tightening mechanism. This shortening of the distance between the hinge and the patch greatly increases the pressure equal of being exerted by the side member through the tightening of the bolt and at the same time, as compared with the single clamp form, substantially eliminates tendency of the clamping parts to slide along the surface of the patch or of the pipe. Where only one patch is to be applied it is possible also to turn the entire clamp about the pipe so as to bring the effective hinge position at that side of the pipe closer to the patch than would otherwise be the case if the additional pressure be desired. This is effected without losing the substantial direct lateral compression effect of the side member upon the patch.

The side clamp members are desirably made duplicates not only because of the undesirability of selecting non-mating parts for these positions in the clamp, but in order to save cost in pipe-making. The balance of the parts in the construction shown invites, in face almost compels, making the two side members duplicates.

Considerable opportunity for choice of the spacing of the effective hinge positions exists according to the purpose for which the clamp is to be used.

It will be evident that the angular extent of the link member about the pipe will in large measure determine the leverage available for clamping the parts. It is intended that the link shall extend considerably less than half the circumference of the pipe.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. An encircling pipe repair clamp comprising a central link member, substantially rigid side members cooperating therewith and a fastening and tightening means engaging the terminal portions of the said side members, the said side members and the link member having interengaging hinging means permitting the anchorage of the side members at spaced positions about the clamp and giving leverage of the fastening about the hinge point.

2. An encircling pipe repair clamp comprising a central link member, duplicate substantially rigid side members each spanning less than a semicircumference of the pipe cooperating therewith and a fastening and tightening means engaging the terminal portion of the said side members, the said side members and the link member having interengaging hinging means by prong and slot connection between them and defining the leverage of the fastening.

3. An encircling repair clamp for pipes comprising a link member extending circumferentially less than half of the circumference of the pipe, substantially rigid side members and the link member having interengaging hinging means near one inner edge each of the side members by prong and slot interlinkage and having flanges at the outer edges of the side members, and clamp-tightening means passing through the flanges.

4. An encircling repair clamp for pipes comprising a link member extending circumferentially less than half of the circumference of the pipe, substantially rigid side members and link member having interengaging hinging means near one inner edge each of the side members by prong and slot interlinkage and having flanges at the outer edges of the side members and clamp-tightening means passing through the flanges, the hinging of one side member with the link member being alternatively at different distances from the edge of one of the joined members.

5. An encircling repair clamp for pipes comprising a link member extending circumferentially less than half of the circumference of the pipe, substantially rigid side members and link member having interengaging hinging means near one edge each of the side members by prong and slot interlinkage and having flanges at the outer edges of the side members and clamp-tightening means passing through the flanges, the side members being duplicates.

SAMUEL M. KASS.